United States Patent [19]
Weiss

[11] Patent Number: 4,783,979
[45] Date of Patent: Nov. 15, 1988

[54] DEVICE FOR MAKING VEHICLES BURGLAR-PROOF

[76] Inventor: Heinz Weiss, Dusseldorf Str. 103, 4000 Dusseldorfer 11, Fed. Rep. of Germany

[21] Appl. No.: 100,482

[22] Filed: Sep. 24, 1987

[30] Foreign Application Priority Data

Sep. 26, 1986 [DE] Fed. Rep. of Germany ....... 3632680

[51] Int. Cl.⁴ .............................................. E05B 71/00
[52] U.S. Cl. .......................................... 70/233; 70/18
[58] Field of Search ................. 70/233, 234, 225, 226, 70/227, 18; 59/78, 78.1

[56] References Cited

U.S. PATENT DOCUMENTS

| | | | |
|---|---|---|---|
| 2,451,100 | 10/1948 | Lecompte | 70/237 |
| 3,756,048 | 9/1973 | Portus | 70/233 |
| 3,969,914 | 7/1976 | Dennen | 70/18 |
| 4,028,916 | 2/1977 | Pender . | |
| 4,079,872 | 3/1978 | Halter | 70/233 |
| 4,086,795 | 7/1978 | Foster et al. . | |

FOREIGN PATENT DOCUMENTS

| | | | |
|---|---|---|---|
| 205278 | 12/1900 | Fed. Rep. of Germany | 70/233 |
| 132445 | 7/1902 | Fed. Rep. of Germany | 70/233 |
| 802885 | 5/1936 | France . | |
| WO83/00354 | 2/1983 | PCT Int'l Appl. | 70/233 |

OTHER PUBLICATIONS

Lueger, Lexikon der Technik, vol. 15, pp. 222-223, 1971.

*Primary Examiner*—Robert L. Wolfe
*Attorney, Agent, or Firm*—Andrus, Sceales, Starke & Sawall

[57] ABSTRACT

A device for making vehicles, especially two-wheelers, burglar-proof comprises locking means for a flexible securing member and a container fixed at the vehicle which has a storage room for the securing member fixed at one end in the container, at the locking means and/or the vehicle as well as an opening for the securing member from which the same protrudes in the non-used condition and through which the same is removable from the container upon use and is adapted to be drawn into the container after use. The container is provided with a driven guide/conveyor wheel for the securing member between the opening and the storage room.

21 Claims, 1 Drawing Sheet

DEVICE FOR MAKING VEHICLES BURGLAR-PROOF

The present invention concerns a device for making vehicles burglar-proof according to the introductory portion of claim 1.

A device having the features of the introductory portion of patent claim 1 is known from German utility model letter No. 83 09 318. The known device comprises a container secured to a part of a two-wheeler and having a storage room for a flexible securing member which is fastened within the container at its one end and which has an opening from which the other end of the securing member protrudes in the unused condition. During use the flexible securing member is removed from the container and is lead around an appropriate object as for instance a street lamp post, tree etc. and is then introduced into the container through the opening and fastened there by means of closure means. After use of the known device the securing member is withdrawn into the container either by means of gravity for which a vertical arrangement of the container is necessary or by winding around a spool located in the storage room which is associated with drive means.

The preceding known device has the disadvantage that the flexible securing member, especially if this is a chain, can very easily be tilted or hooked during removal from the container or drawing into the container so that a satisfactory function of the device is no more guaranteed. Furthermore, the embodiment according to which the flexible securing member is drawn into the container by means of gravity makes necessary a certain vertical alignment of the storage room so that the range of application is limited on account of this reason. Also the above described second embodiment of the known securing device has disadvantages since a storage room having a relatively large volume for the receipt of the securing member, the spool and the winding mechanism is necessary. This is especially true if a chain is used as flexible securing member which makes necessary a relatively large space for winding compared with a tape.

It is the object of the invention to provide a device of the cited kind which, with special regard to a compact design, can be used for making vehicles burglar-proof in an especially trouble-free manner.

This object is achieved in an inventive manner by a device having the features of patent claim 1.

The invention is based on the principle to not move back the flexible securing member, as for instance a rope, tape, a chain etc., after its use into the container by gravity alone or by winding around a spool located in the storage room and making necessary a relatively large space, as this is the case with the above-mentioned prior art, but to provide instead of this a driven guide/-conveyor wheel within the container between the opening and the storage room that guarantees a faultless withdrawal of the flexible securing member. Herewith the securing member is not wound sround the guide/-conveyor wheel but winds around the same only about a certain angle of circumference which depends on the location and the size of the guide/conveyor wheel as well as on the desired withdrawal force and which is between about 10° and about 23°, preferably between about 60° and about 180°.

The inventive device has several advantages. So the flexible securing member is not only guided during withdrawl into the container but also simultaneously during removing the same from the container so that tilting, jamming or hooking of the same is not possible. Since the securing member is laid down in a space-saving manner in the storage room behind the guide/ conveyor wheel during withdrawal into the container, which, in the case of using a chain as flexible securing member, is done for instance by pushing the several chain links one into the other or, when using a flexible tape or rope, by laying the same several times one upon another or side by side, the inventive device has a substantially smaller design compared with the above-mentioned known device according to which a winding spool is used. Furthermore, a vertical arrangement of the inventive device is not necessary since withdrawal of the flexible securing member is caused by the driven guide/conveyor wheel which is partially encompassed by the securing member and not by gravity as it is the case with one embodiment of the known device. From this it results that the inventive device can be mounted in any position at the vehicle by which its versatility is increased. So for instance the inventive device may be used not only for the securing of two-wheelers, as for instance bicycles, motor-cycles etc., but also for automotive vehicles. For these vehicles the device is for instance located below the dash board in such a manner that the flexible securing member removed from the container extends between the steering wheel of the vehicle and the brake and/or clutch pedal and prevents by this an actuation of the steering wheel and of the pedals. Furthermore, it is possible to secure with the inventive device water vehicles, as for instance surf boards, sail boats, motors boats etc. For this either a member necessary for the operation of the water vehicles, as for instance the mast or the steering, is restricted in its movement or is anchored by the flexible securing member or the flexible securing member is lead around a post or something like that and is thereafter fixedly secured at the device by means of the locking means.

In order to attain an especially compact design of the inventive device,one embodiment has the feature that the driven guide/conveyor wheel is located directly behind the opening through which the flexible securing member can be removed from the container. Such an embodiment has the additional advantage that an especially good guiding of the securing member is guaranteed on account of the relatively short distance between the opening and the guide/conveyor wheel so that this cannot tilt or be jammed during removal or drawing into the container.

The drive of the guide/conveyor wheel can be designed in a different manner in the inventive device. So for instance one further embodiment of the device has the feature that the guide/conveyor wheel is biased by a spring, as for instance a spiral spring, such that it draws the flexible securing member into the container. With each removal of the securing member from the container the guide/conveyor wheel will be rotated due to the engagement of the securing member with the guide/conveyor wheel and thus the spiral spring located at the guide/conveyor wheel is again biased. Of course, it is possible to provide instead of the spring other resilient members at the guide/conveyor wheel which bias the same, for instance by rotating. As resilient members for this, for instance rubber-elastic plastic materials, as for instance polyurethane, or rubber may be used. These members are secured with their one side at the guide/conveyor wheel and with their opposite side at a portion of the container so that they can also be twisted or rotated which is caused by the removal of the securing member and thus bias the guide/conveyor wheel in an opposite sense with respect to this twisting or rotation. Furthermore, it is also possible to drive the guide/conveyor wheel by a corresponding electric motor or by means of a crank provided at the outside of the container manually. By this not only the removal of the flexible securing member from the container but also the insertion thereof into the container can be caused.

With an especially suited embodiment of the inventive device the flexible securing member is a chain which has alternately horizontal and vertical chain links. Such a chain which customarily consists of hardened steel and is also known as "armoured chain" has not only the advantage that it can be destroyed only with large expenditures of time by means of the customary nippers, diagonal cutters and sawing tools but also the advantage that it can be pushed together to a substantially smaller volume compared with a corresponding wire cable with the same stability. This has the result that with a device provided with such a chain the storage room for the flexible securing member can have a correspondingly smaller volume so that such a device has a very compact design. So for instance an embodiment of the inventive device with which the chain has a length of between about 150 cm and about 200 cm has a width of about 3 cm, a height of about 10 cm and a length of about 15 cm. The chain links have a material thickness between about 4 mm and about 7 mm, preferably of about 5 mm, and a length between about 12 mm and about 18 mm, preferably of about 15 mm.

In order to guarantee an especially good guiding and conveying of the flexible securing member by means of the guide/conveyor wheel with the above-cited embodiment according to which the flexible securing member is a chain, the guide/conveyor wheel is designed as gearwheel wherein the individual teeth of the gearwheel serve for the reception of the horizontal chain links. Between the teeth of the gearwheel recesses are additionally provided which are adapted in their shape and size to the vertical chain links so that the same receive and hold the vertical chain links when the chain is turned round the guide/conveyor wheel. Since the recesses located between the teeth of the guide/conveyor wheel do not extend about the complete thickness of the same, they have two opposite wall portions which prevent lateral sliding the chain off the guide/conveyor wheel and make impossible tilting or jamming of the chain.

According to a further embodiment of the inventive device a guide member is associated with the above-cited guide/conveyor wheel which is designed as gearwheel. This guide member is located above the gearwheel. It causes lateral guiding of the chain during its removal of the container or during its drawing into the same so that the chain engages the guide/conveyor wheel in any case. Preferably, this guide member consists of a groove which is provided in a container portion located above the gearwheel. This 5 container portion especially extends about a certain peripheral angle of the guide/conveyor wheel in an arcuate manner. The groove serves for taking up the upper portion of the vertical links of the chain and has a greater distance to the guide/conveyor wheel in its inlet and outlet portion than in its center so that by this the positioning of the chsin not only when drawing in but also upon removal of the same is simplified. Of course, it is also possible to provide a correspondingly shaped guide member above the guide/conveyor wheel with those embodiments of the inventive device according to which the flexible securing members consists for instance of a rope or a tape.

In order to attain alignment of the horizontal and vertical links of the chain, another embodiment of the inventive device has an opening through which the chain is removed from the container or is drawn into the same which is designed as cross-slot. On account of the same reason a cross-slot-like guide channel for the chain can extend from the opening to the guide/conveyor wheel by which the positioning of the chain on the guide/conveyor wheel which is designed as gearwheel is simplified. Of course, it is also possible to additionally provide a second cross-slot-like guide channel between storage room and gearwheel.

On principle, any locking means may be used for fastening the removed flexible securing member at the container when the device is used. Accordingly, it is for instance possible to provide a shackle lock at the protruding end of the flexible securing member the shackle of which is laid around a suitable part of the vehicle, as for instance around a frame tube portion or a spoke of two-wheelers, and is thereafter locked by pushing into the locking mechanism. If a chain is provided as flexible securing member, a preferred embodiment of the inventive device proposes that the chain has a mandrel at its end protruding from the container which is insertable into a recess provided at the container and is there lockable by means of the locking mechanism associated with the recess. Furthermore, if the length of the chain is to be kept variable with such embodiments, it is recommended to design the above-cited locking mandrel such that it is insertable into a chain link of any design. For instance, this can be achieved by conically shaping the locking mandrel and inserting the same with its tapered end into the recess and locking this end therein while the enlarged portion of the locking mandrel prevents drawing the chain off the locking mandrel.

Another embodiment of the inventive device does not include any locking means. According to this embodiment during use the securing member which is designed as chain is removed from the container and lead around a suitable object, as for instance a street lamp post, tree etc., and thereafter the end of the chain is optionally in addition lead around a suitable vehicle part and locked by means of a suitable lock, as for instance a customary shackle lock, at any chain link in such a manner that the vehicle is made burglar-proof.

On principle, the shape of the container of the inventive device is of no importance and depends on the length and selection of the flexible securing member. Normally, it is recommended to design the container such that it is adapted very tightly to the corresponding part of the vehicle and thus has no disturbing influence. Obviously, the container itself has to be mounted to the vehicle in a burglar-proof manner. This may be done for instance by welding if the container consists of metal. Clips that encircle the frame parts may be used for plastic containers which are for instance mounted to round frame parts of two-wheelers. According to this embodiment the clips are introduced into the interior of the container and are connected there with the container, for instance by means of screws, such that the clips can be reached and unscrewed only through a closable lid provided in the container.

Furthermore, the container can be provided with tapelike stengthening members, especially of metal, which encompass the container and prevent, especially with plastic containers, that the same are broken open in an unauthorized manner. These strengthening members can serve also for the secure mounting of the locking means and/or for mounting the container at the vehicle.

Preferably, the flexible securing member, the inner walls of the storage room, the guide/conveyor wheel, the opening as well as possibly present guide channels are provided with a plastic coating in order to prevent the undesired development of excessive noise when the flexible securing member is removed from the storage room. Of course, it is also possible to manufacture the guide/conveyor wheel, the guide channels and the guide members themselves of plastic material.

As regards the fastening of the locked end of the securing member it has to be stated that for this any method of fastening is suitable that prevents a non-allowed detachment of the locked end of the securing member. So for instance the securing member can be locked by means of suitable fastening means, as for instance screws, welding etc., within the container. Furthermore, it is possible to fasten the end of the securing member at the locking means so that in use even after destruction of the container the inventive device makes the vehicle burglarproof in an effective manner since the protruding end of the securing member is locked by means of the locking means either and thus a closed loop of the securing member develops. It is also possible to provide the locked end of the securing member at a suitable part of the vehicle, for instance with two-wheelers at a frame part, in a nondetachable manner.

An especially preferred embodiment of the inventive device includes a securing member which is sufficiently long so that this, in use, can be lead not only around a corresponding object, as for instance a tree or a street lamp post, but also in addition around one or several movable parts of the vehicle one or several times. By this it is secured that the vehicle can be stolen only by destructon of the securing member or of the locking means which makes necessary considerable efforts.

Futhermore, the inventive device may be provided with locking means for the securing member which is located and designed such that it locks the securing member upon removal at a desired length. Such a locking may be for instance achieved by associating with the securing member a roller which is so located and biased by mean of a spring that it allows an unrestrained removal of the securing member from the container and prevents by clamping engagement withdrawal of the securing member into the container. If for instance the securing member is a chain, the locking means may consist of a roller supported by a lever, said roller contacting the horizontal chain links. According to this embodiment the lever of the roller is biased such that upon removal of the chain the same is not locked while upon drawing in the chain the spring-biased lever is tilted and causes engagement of the roller with the respective horizontal ponding position. In order to detach such a locking and to guide the chain back into the container an actuation means associated with the locking means is pulled which causes tilting of the lever out of the path of movement of the chain.

Furthermore, with another embodiment of the invention device a guide/conveyor wheel may be used instead of the above-cited gearwheel which has alternately around its periphery depressions and recesses. The depressions extend over the thickness of the guide/conveyor wheel and serve for the reception of the horizontal chain links while the recesses take up the vertical chain links. Due to the different depth of the depressions and recesses the chain is securely guided and held at such a guide/conveyor wheel. It is also possible to provide recesses which possess opposite raised side wall portions. Portions of the horizontal chain links abut against these raised side wall portions so that the chain is securely held at the guide/conveyor wheel.

With an especially suitable support for the guide/conveyor wheel this is rotatably supported by an axis fixedly secured to the container. A spiral spring is mounted with one end at this axis while the other end of the spiral spring is locked at the guide/conveyor wheel so that during removal of the securing member the spiral spring is biased.

Further improvements of the invention device are described in the subclaims.

The inventive device is now described in detail by means of examples in connexion with the drawing. Of the drawing FIG. 1 shows a schematic perspective side view of the device of which a portion of the side wall is broken out;

Figure 1:
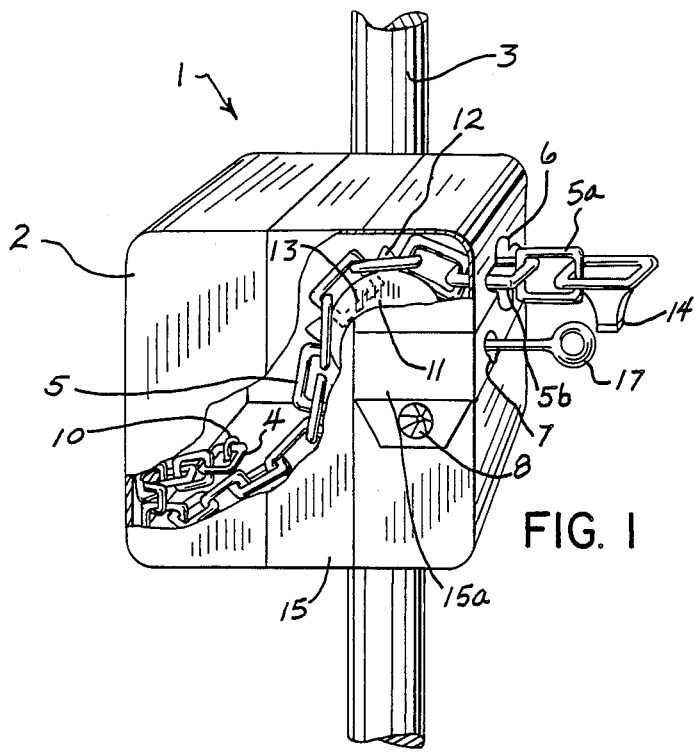

A device for making vehicles burglar-proof which is shown in FIG. 1 and designated with 1 includes a container 2 which is adapted to be undetachably fastened to a part 3 of a vehicle by means of suitable means, for instance welding or screwing. A storage room 4 for a flexible securing member 5 is provided within the container 2. In the embodiment of FIG. 1 this securing member consists of a chain. The chain has alternately vertical and horizontal chain links 5a and 5b.

The chain protrudes from an opening 6 provided in the container and is adapted to be drawn off the container 2 upon use of the device and to be drawn into the container after use of the device. In the shown embodiment the securing member is secured at the container at its opposite end by means of suitable locking means 10, for instance by means of a screw, which is accessible only from the interior. A guide/conveyor wheel 11 for the securing member 5 is positioned between the opening 6 and the storage room 4. In the shown embodiment the guide/conveyor wheel consists of a gearwheel which is biased by means of a non-shown spring such that it again draws the pulled-out chain into the container after use. The gearwheel has a plurality of teeth 12 for taking up the horizontal chain links 5b and recesses 13 between adjacent teeth which are adapted in their size to the vertical chain links 5a and are used for taking up and holding the vertical chain links as this is still described in the following in connection with FIGS. 3 and 4. A locking means 7 for the securing member 5 is provided at the outside of the container 2. The locking means includes reception means 8 designed as a bore into which a locking mandrel 14 is insertable and lockable which is provided at the protruding end of the securing member. In order to prevent an undesired destruction of the container 2 this has tape-like strengthening member 15 of metal. Simultaneously a tapelike strengthening member 15a serves for reception of the locking means 7.

Figure 2:
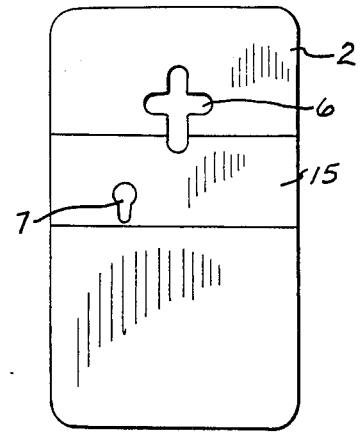
FIG. 2 shows a front view of the device shown in FIG. 1.

As one can take especially from FIG. 2, the opening 6 is designed as a cross-slot in this embodiment. By this it is achieved that the horizontal and vertical links of the chain which is not shown are aligned during removal of the container 2 and especially during drawing into the container such that they are correctly taken up by the teeth 12 or the recesses 13 of the guide/conveyor wheel 11.

Figure 3:
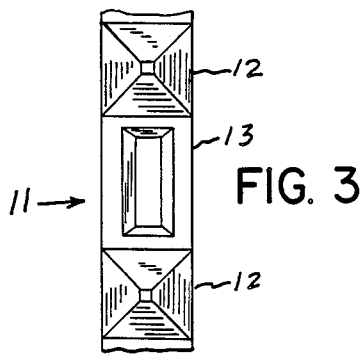
FIG. 3 shows a part front view of a first embodiment of a guide/conveyor wheel which is designed as gearwheel.
Figure 4:
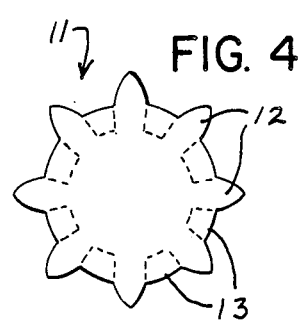
FIG. 4 shows a side view of the guide/conveyor wheel of FIG. 3.

As FIG. 3 and 4 show best, the guide/conveyor wheel 11 has a plurality of teeth 12 as well as recesses 13 located therebetween which do not extend about the complete thickness of the guide/conveyor wheel. During movement of the chain upon removal from the container or upon drawing into the container the horizontal chain links 5b are held by the teeth 12 and the vertical chain links 5a are held by the recesses 13 so that lateral sliding and especially sliding the chain off the guide/conveyor wheel and tilting or jamming of the same is made impossible.

The above-described embodiment functions in the following manner:

At first, the device 1 is connected to a part 3 of the vehicle in an undetachable manner by means of suitable fastening means. According to the above-cited embodiment a chain is located within the container 2. According to the intended use the length of the chain is between about 100 cm and 200 cm. With its one end the chain is fixed within the storage room and protrudes with its opposite end slightly from the container so that it may be pulled easily from the same in the direction of the arrow 16. In order to make the vehicle burglar-proof, the chain is removed from the container and lead around a suitable object, as for instance a tree etc. Thereafter, the locking mandrel 14 is inserted into the reception means 8 and locked there by turning a key 17 of the locking means 7. The locking mandrel 14 can be detached only by the key 17 whereupon the chain is pulled into the container 2 by means of the guide/conveyor wheel 11 driven by the spring and the chain collapses in the storage room 4 of the container by pushing the chain links one upon the other.

Figure 5:
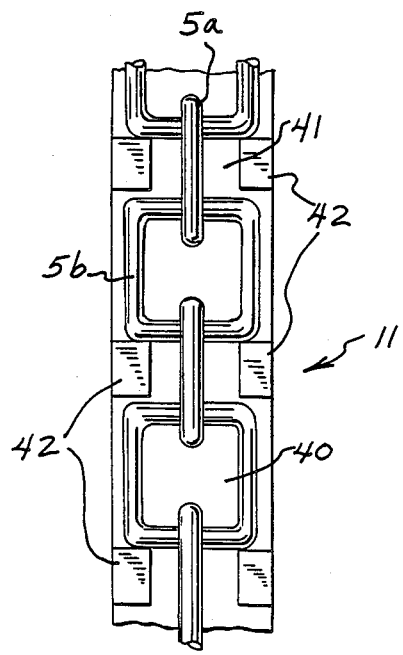
FIG. 5 shows a part front view of a second embodiment of the guide/conveyor wheel.

A further embodiment of the guide/conveyor wheel 11 is shown in FIG. 5. This guide/conveyor wheel has alternately depressions 40 as well as recesses 41. The depressions 40 serve for taking up the horizontal chain links 5b and the recesses 41 serve for taking up the vertical chain links 5a. The depressions 40 and the recesses 41 are adapted in their size to the size of the chain links. According to the embodiment shown in FIG. 5 each recess 41 contains opposite raised side wall portions 42 which are abutted by portions of the horizontal chain links. This results in a correct guiding and holding of the chain at the guide/conveyor wheel 11.

According to an embodiment which is not shown, the parts of the locking means or of the lock and of the actuation means for the locking means which are accessible from outside are covered by a lid which for instance may be tilted away upon use. The lid serves as additional protection and prevents at the same time soiling or wetting during rain. Furthermore, it serves as protection against possible injuries.

I claim:

1. A device for making vehicles, especially two-wheelers, burglar-proof, said device comprising locking means for a flexible securing member and a container adapted to be fastened to the vehicle which has storage room for the securing member, said securing member being fixed at one end in the container, at the locking means and/or the vehicle, said container having an opening for the securing member from which the same protrudes in the non-used condition and through which the same is adapted to be removed upon use and to be drawn into the container after use, characterized in that said container (2) is provided with a driven guide/conveyor wheel (11) for said securing member (5) between said opening (6) and said storage room (4).

2. The device according to claim 1, characterized in that the driven guide/conveyor wheel (11) is located directly behind said opening (6).

3. The device according to claim 1, characterized in that the driven guide/conveyor wheel (11) is biased by means of a spring such that it draws the securing member (5) into the container (2).

4. The device according to claim 1, characterized in that the driven guide/conveyor wheel (11) is associated with a crank provided at the outside of the container (2).

5. The device according to claim 1, characterized in that the securing member (5) is a chain which has alternately horizontal (5b) and vertical (5a) links.

6. The device according to claim 5, characterized in that said driven guide/conveyor wheel (11) is a gearwheel which is provided with a plurality of recesses (13) which are located between adjacent teeth (12), respectively.

7. The device according to claim 6, characterized in that said gearwheel is associated with a guide member for the chain located above said gearwheel.

8. The device according to claim 7, characterized in that said guide member is designed as groove which is provided in a container portion located above the gearwheel.

9. The device according to claim 5, characterized in that said container (2) has a cross-slot-like opening (6) for said chain.

10. The device according to claim 9, characterized in that a cross-slot-like guide channel for the chain extends from said opening (6) to said guide/conveyor wheel (11).

11. The device according to claim 1, characterized in that said securing member (5) is fixed at its one end within the container (2) and is provided at its other end with a locking mandrel (14), and in that said container (2) includes reception means (8) associated with said locking means (7) into which the locking mandrel (14) is insertable and lockable.

12. The device according to claim 1, characterized in that said container (2) is adapted to be mounted from outside at a part (3) of a vehicle in an undetachable manner.

13. The device according to claim 1, characterized in that said container (2) includes tapelike strengthening members (15), especially of metal.

14. The device according to claim 11, characterized in that said container (2) includes tape-like strengthening members (15) and that said locking means (7) and said reception means (8) for said locking mandrel (14) are positioned at one of said tape-like strengthening members (15).

15. The device according to claim 1, characterized in that said container (2) is fastened to the vehicle in an undetachable manner by means of screws which can be screwed in but not screwed off.

16. The device according to claim 1 according to which the locking means is a lock at which the one end of said flexible securing member is fixed and through which the other end of said securing member is lockable upon use, characterized in that the lock is positioned at a part of the vehicle in an undetachable manner.

17. The device according to claim 5, characterized in that said driven guide/conveyor wheel (11) alternately includes a depression (40) extending over the thickness thereof for reception of the horizontal chain links (5b) and a recess (41) for the reception of the vertical chain links (5a).

18. The device according to claim 17, characterized in that the recess (41) of said guide/conveyor wheel (11) has opposite raised side wall portions (42).

19. The device according to claim 1, characterized in that the flexible securing member (5) is associated with locking means fixing said securing member during removal at a desired length.

20. The device according to claim 19, characterized in that said locking means consists of a lever provided with a roller, said lever being so positioned and biased by a spring that it allows free removal of the securing member from the container and only during drawing the securing member back into the container fixes the same by clamping engagement.

21. The device according to claim 20, characterized in that said locking means is adapted to be detached from the clamping engagement with the securing member by means of an actuation means positioned at the outside of said container.

* * * * *